(12) United States Patent
Yamanaka et al.

(10) Patent No.: US 11,697,408 B2
(45) Date of Patent: Jul. 11, 2023

(54) PARKING ASSISTING DEVICE, PARKING ASSISTING METHOD AND STORAGE MEDIUM STORING PROGRAM FOR THE PARKING ASSISTING DEVICE

(71) Applicant: HONDA MOTOR CO., LTD., Tokyo (JP)

(72) Inventors: Hiroshi Yamanaka, Wako (JP); Yasushi Shoda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 259 days.

(21) Appl. No.: 17/118,710

(22) Filed: Dec. 11, 2020

(65) Prior Publication Data

US 2021/0179086 A1  Jun. 17, 2021

(30) Foreign Application Priority Data

Dec. 13, 2019  (JP) .................................. 2019-225906

(51) Int. Cl.
*B60W 30/06* (2006.01)
*B60W 50/14* (2020.01)
*B60K 35/00* (2006.01)

(52) U.S. Cl.
CPC ............. *B60W 30/06* (2013.01); *B60K 35/00* (2013.01); *B60W 50/14* (2013.01);
(Continued)

(58) Field of Classification Search
None
See application file for complete search history.

(56) References Cited

U.S. PATENT DOCUMENTS 7,948,517 B2 * 5/2011 Asai ........................ H04N 23/68
348/148
8,886,023 B2 * 11/2014 Satoh ....................... G06T 11/00
386/358
(Continued)

FOREIGN PATENT DOCUMENTS

CA        3029410 A1 * 1/2018 ............... B60R 1/00
CN     101816175 A  * 8/2010 ............... B60R 1/00
(Continued)

OTHER PUBLICATIONS

Office Action received in corresponding Japanese application No. 2019-225906 dated Nov. 2, 2021 with English translation(6 pages).

*Primary Examiner* — Kevin R Steckbauer
(74) *Attorney, Agent, or Firm* — Rankin, Hill & Clark LLP

(57) ABSTRACT

An automatic parking control unit comprises a recognizing section recognizing an outer world outside a vehicle, a vehicle operation control section performing an operation control on the vehicle, an automatic parking control section performing a parking operation to park the vehicle at a target parking position and a display control section synthesizing images taken by a camera group into an image of a surrounding area of the vehicle and displaying the image on an output device group. The display control section displays an image of the surrounding area of the vehicle and a vehicle body image of the vehicle with a portion of the vehicle made translucent, the portion of the vehicle making a blind area to a driver in the surrounding area of the vehicle and the portion of the vehicle is changed according to a direction in which the vehicle is running.

8 Claims, 8 Drawing Sheets

(52) U.S. Cl.
CPC .. *B60K 2370/171* (2019.05); *B60K 2370/175* (2019.05); *B60K 2370/176* (2019.05); *B60K 2370/21* (2019.05); *B60K 2370/31* (2019.05); *B60K 2370/52* (2019.05); *B60R 2300/602* (2013.01); *B60R 2300/605* (2013.01); *B60R 2300/802* (2013.01); *B60R 2300/806* (2013.01); *B60W 2050/146* (2013.01)

(56) References Cited

U.S. PATENT DOCUMENTS

| | | | | |
|---|---|---|---|---|
| 8,988,250 | B2 * | 3/2015 | Suzuki | G06T 15/205 |
| | | | | 348/148 |
| 9,646,572 | B2 * | 5/2017 | Yamada | G09G 5/377 |
| 10,032,298 | B2 * | 7/2018 | Hashimoto | H04N 5/265 |
| 10,112,539 | B2 * | 10/2018 | Kameshima | B60K 35/00 |
| 10,475,242 | B2 * | 11/2019 | Hashimoto | G06T 19/006 |
| 10,896,335 | B2 * | 1/2021 | Herman | G06V 40/103 |
| 10,930,070 | B2 * | 2/2021 | Watanabe | G06T 15/503 |
| 10,960,820 | B2 * | 3/2021 | Onishi | B62D 15/027 |
| 10,994,665 | B2 * | 5/2021 | Matsuba | B60R 1/00 |
| 11,034,299 | B2 * | 6/2021 | Peterson | G06V 20/58 |
| 11,091,096 | B2 * | 8/2021 | Watanabe | B60R 1/002 |
| 11,214,197 | B2 * | 1/2022 | Yamanaka | G08G 1/166 |
| 11,273,763 | B2 * | 3/2022 | Suda | B60R 1/00 |
| 11,383,656 | B2 * | 7/2022 | Nagata | G06T 11/00 |
| 2003/0108222 | A1 * | 6/2003 | Sato | G06T 3/40 |
| | | | | 382/104 |
| 2004/0196368 | A1 * | 10/2004 | Asai | B60R 1/12 |
| | | | | 348/148 |
| 2010/0238051 | A1 * | 9/2010 | Suzuki | G06T 15/205 |
| | | | | 340/932.2 |
| 2012/0113261 | A1 * | 5/2012 | Satoh | B60R 1/00 |
| | | | | 348/148 |
| 2012/0249789 | A1 * | 10/2012 | Satoh | B60R 1/00 |
| | | | | 348/143 |
| 2013/0166190 | A1 * | 6/2013 | Ikeda | B62D 15/027 |
| | | | | 701/400 |
| 2014/0292805 | A1 * | 10/2014 | Yamada | G09G 5/00 |
| | | | | 345/629 |
| 2016/0042543 | A1 * | 2/2016 | Hashimoto | G06T 3/4038 |
| | | | | 345/629 |
| 2016/0185293 | A1 * | 6/2016 | Gieseke | B60R 1/00 |
| | | | | 348/115 |
| 2016/0288717 | A1 * | 10/2016 | Kameshima | B60R 1/12 |
| 2016/0350974 | A1 * | 12/2016 | Hashimoto | G06F 3/14 |
| 2017/0061689 | A1 * | 3/2017 | Petrany | H04N 7/181 |
| 2017/0282813 | A1 * | 10/2017 | Hashimoto | G06V 20/58 |
| 2018/0134217 | A1 * | 5/2018 | Peterson | G06V 20/58 |
| 2019/0009720 | A1 * | 1/2019 | Omiya | G08G 1/165 |
| 2020/0035207 | A1 * | 1/2020 | Maruoka | G09G 5/36 |
| 2020/0156542 | A1 * | 5/2020 | Watanabe | B60R 1/002 |
| 2020/0167996 | A1 * | 5/2020 | Watanabe | B60R 1/00 |
| 2020/0215977 | A1 * | 7/2020 | Onishi | B60R 1/00 |
| 2020/0218910 | A1 * | 7/2020 | Herman | G06V 20/20 |
| 2020/0238921 | A1 * | 7/2020 | Matsuba | H04N 7/181 |
| 2021/0024000 | A1 * | 1/2021 | Peterson | G08G 1/167 |
| 2021/0039554 | A1 * | 2/2021 | Suda | H04N 23/90 |
| 2021/0078496 | A1 * | 3/2021 | Yamamoto | B60W 50/14 |
| 2021/0178969 | A1 * | 6/2021 | Yamanaka | H04N 7/181 |
| 2021/0179086 | A1 * | 6/2021 | Yamanaka | B60W 50/14 |
| 2021/0300246 | A1 * | 9/2021 | Peterson | G06V 20/58 |
| 2021/0380046 | A1 * | 12/2021 | Nagata | G06T 11/00 |
| 2022/0297615 | A1 * | 9/2022 | Nagata | B60R 11/04 |

FOREIGN PATENT DOCUMENTS

| | | | | |
|---|---|---|---|---|
| CN | 102474596 A * | 5/2012 | | B60R 1/00 |
| CN | 102714710 A * | 10/2012 | | G06K 9/00805 |
| CN | 101816175 B * | 3/2014 | | B60R 1/00 |
| CN | 105073499 A * | 11/2015 | | B60K 35/00 |
| CN | 105073499 B * | 1/2018 | | B60K 35/00 |
| CN | 107848465 A * | 3/2018 | | B60R 1/06 |
| CN | 109691089 A * | 4/2019 | | B60R 1/00 |
| CN | 110023947 A * | 7/2019 | | B60R 11/04 |
| CN | 111034188 A * | 4/2020 | | B60R 1/00 |
| CN | 111201789 A * | 5/2020 | | B60R 1/00 |
| CN | 111290571 A * | 6/2020 | | B60K 35/00 |
| CN | 112141008 A * | 12/2020 | | B60K 35/00 |
| CN | 107848465 B * | 6/2021 | | B60R 1/06 |
| CN | 113060127 A * | 7/2021 | | B60K 35/00 |
| CN | 113170082 A * | 7/2021 | | B60R 1/00 |
| CN | 113170084 A * | 7/2021 | | B60R 1/00 |
| CN | 111201789 B * | 3/2022 | | B60R 1/00 |
| CN | 115123144 A * | 9/2022 | | B60R 3/02 |
| DE | 602004000387 T2 * | 10/2006 | | B60R 1/00 |
| DE | 112017007812 T5 * | 4/2020 | | B60R 1/00 |
| DE | 102020126509 A1 * | 4/2021 | | |
| EP | 1465428 A1 * | 10/2004 | | B60R 1/00 |
| EP | 1465428 B1 * | 2/2006 | | B60R 1/00 |
| EP | 2257065 A1 * | 12/2010 | | B60R 1/00 |
| EP | 2456203 A1 * | 5/2012 | | B60R 1/00 |
| EP | 2512133 A1 * | 10/2012 | | G06K 9/00805 |
| EP | 2512133 B1 * | 7/2018 | | G06K 9/00805 |
| EP | 2257065 B1 * | 4/2019 | | B60R 1/00 |
| EP | 3772719 A1 * | 2/2021 | | B60R 1/00 |
| EP | 3792868 A1 * | 3/2021 | | B60R 1/00 |
| EP | 3772719 B1 * | 10/2022 | | B60R 1/00 |
| JP | 2000318554 A * | 11/2000 | | B62D 15/027 |
| JP | 3149870 B2 * | 3/2001 | | B62D 15/027 |
| JP | 2003244688 A * | 8/2003 | | G06T 3/40 |
| JP | 2004026012 A * | 1/2004 | | |
| JP | 2004336613 A * | 11/2004 | | |
| JP | 2005001570 A * | 1/2005 | | |
| JP | 3797343 B2 * | 7/2006 | | |
| JP | 2009101984 A * | 5/2009 | | B60R 1/00 |
| JP | 2010-114618 A | 5/2010 | | |
| JP | 2010109684 A * | 5/2010 | | |
| JP | 2010114618 A * | 5/2010 | | |
| JP | 4593070 B2 * | 12/2010 | | G06T 3/40 |
| JP | 2011023805 A * | 2/2011 | | B60R 1/00 |
| JP | 5108837 B2 * | 12/2012 | | B60R 1/00 |
| JP | 5118605 B2 * | 1/2013 | | |
| JP | 5134504 B2 * | 1/2013 | | |
| JP | 2014-036326 A | 2/2014 | | |
| JP | 5421788 B2 * | 2/2014 | | B60R 1/00 |
| JP | 2014-072604 A | 4/2014 | | |
| JP | 2014-198531 A | 10/2014 | | |
| JP | 2017-126834 A | 7/2017 | | |
| JP | 2018056951 A * | 4/2018 | | B60R 1/00 |
| JP | 2019036831 A * | 3/2019 | | B60R 1/00 |
| JP | 2019-103044 A | 6/2019 | | |
| JP | 2019087980 A * | 6/2019 | | B60R 1/00 |
| JP | 2020068499 A * | 4/2020 | | B60K 35/00 |
| JP | 6740991 B2 * | 8/2020 | | B60R 1/00 |
| JP | 2021043815 A * | 3/2021 | | B60R 1/00 |
| JP | 6876236 B2 * | 5/2021 | | B60R 1/00 |
| JP | 6877115 B2 * | 5/2021 | | B60R 1/00 |
| JP | 2021097281 A * | 6/2021 | | B60K 35/00 |
| JP | 2021164007 A * | 10/2021 | | |
| JP | 2022010577 A * | 1/2022 | | B60W 30/06 |
| JP | 7018923 B2 * | 2/2022 | | B60K 35/00 |
| JP | 7056034 B2 * | 4/2022 | | B60R 1/00 |
| WO | WO-2009044654 A1 * | 4/2009 | | B60R 1/00 |
| WO | WO-2009104675 A1 * | 8/2009 | | B60R 1/00 |
| WO | WO-2010127761 A2 * | 11/2010 | | G06K 9/00798 |
| WO | WO-2011007683 A1 * | 1/2011 | | B60R 1/00 |
| WO | WO-2011070641 A1 * | 6/2011 | | B60R 1/00 |
| WO | WO-2012073592 A1 * | 6/2012 | | B60R 1/00 |
| WO | WO-2014156788 A1 * | 10/2014 | | B60K 35/00 |
| WO | WO-2016178190 A1 * | 11/2016 | | B60R 1/06 |
| WO | WO-2017034744 A1 * | 3/2017 | | B60R 1/00 |
| WO | WO-2017122654 A1 * | 7/2017 | | B60R 1/00 |
| WO | WO-2018061261 A1 * | 4/2018 | | B60R 1/00 |
| WO | WO-2019035229 A1 * | 2/2019 | | B60R 1/00 |
| WO | WO-2019074005 A1 * | 4/2019 | | B60R 1/00 |
| WO | WO-2019093378 A1 * | 5/2019 | | B60R 1/00 |
| WO | WO-2020122083 A1 * | 6/2020 | | B60R 1/00 |

* cited by examiner

PARKING ASSISTING DEVICE, PARKING ASSISTING METHOD AND STORAGE MEDIUM STORING PROGRAM FOR THE PARKING ASSISTING DEVICE

CROSS REFERENCE TO RELATED APPLICATIONS

This application claims the foreign priority benefit under 35 § 119 of Japanese Patent Application No. 2019-225906 filed on Dec. 13, 2019, the disclosure of which is incorporated herein by reference.

TECHNICAL FIELD OF THE INVENTION

The present invention relates to a parking assisting device, a parking assisting method and a storage medium storing a program for the parking assisting device.

BACKGROUND OF THE INVENTION

There have been more and more vehicles with an automatic parking system that is equipped with cameras and sonars to show a surrounding area of a vehicle on a display and detect an obstacle in the surrounding area to stop the vehicle and is intended to automatically park the vehicle at a designated parking position. JP2010-114618A discloses a vehicle surrounding monitoring system to display a blind area in the surrounding area of the vehicle that a driver cannot see.

This vehicle surrounding monitoring system is intended to produce a blind area image from images taken by a side camera of a surrounding area of the vehicle that is blind to the driver, the blind area image being an image that could be seen from a viewing point of the driver. Next, the vehicle surrounding monitoring system shows on a display a translucent vehicle image of the vehicle that could be seen from the viewing point of the driver on which a translucent tire image of a tire is superimposed. In this superimposed image, the tire can be seen turning in conjunction with an operation of a steering wheel. The driver can instantly recognize a space on each side of the vehicle by having a look at this superimposed image.

SUMMARY OF THE INVENTION

There is a top perspective view image (three-dimensional view image) for a driver to recognize a state in the surrounding area of the vehicle, the top perspective view image being an image of the vehicle seen from a viewing point located obliquely upward of the vehicle. However, JP2010-114618A does not describe an image of a surrounding area of the vehicle that is blind to the driver, the image being not seen from the top perspective view image. An objective of the present invention is to display the blind area that is blind to the driver in the top perspective view image.

The parking assisting device of the present invention comprising a processor that comprises a recognizing section recognizing an outer world outside a vehicle a vehicle operation control section controlling an operation of the vehicle an automatic parking control section performing a parking operation to park the vehicle at a target parking position that is determined with a predetermined measure; and a display control section producing an image of a surrounding area of the vehicle from images taken of the surrounding area of the vehicle by an imaging device with which the vehicle is equipped, wherein the display control section displays a vehicle body image of the vehicle and the image of the surrounding area of the vehicle on which the vehicle body image is superimposed, the vehicle body image shows a portion of the vehicle made translucent, which makes a blind area to a driver in the surrounding area of the vehicle and the portion of the vehicle made translucent is changed according to a direction in which the vehicle is running.

According to the present invention, the blind area to the driver can be indicated in the top perspective view image.

DETAILED DESCRIPTION OF THE EMBODIMENT

Figure 1:
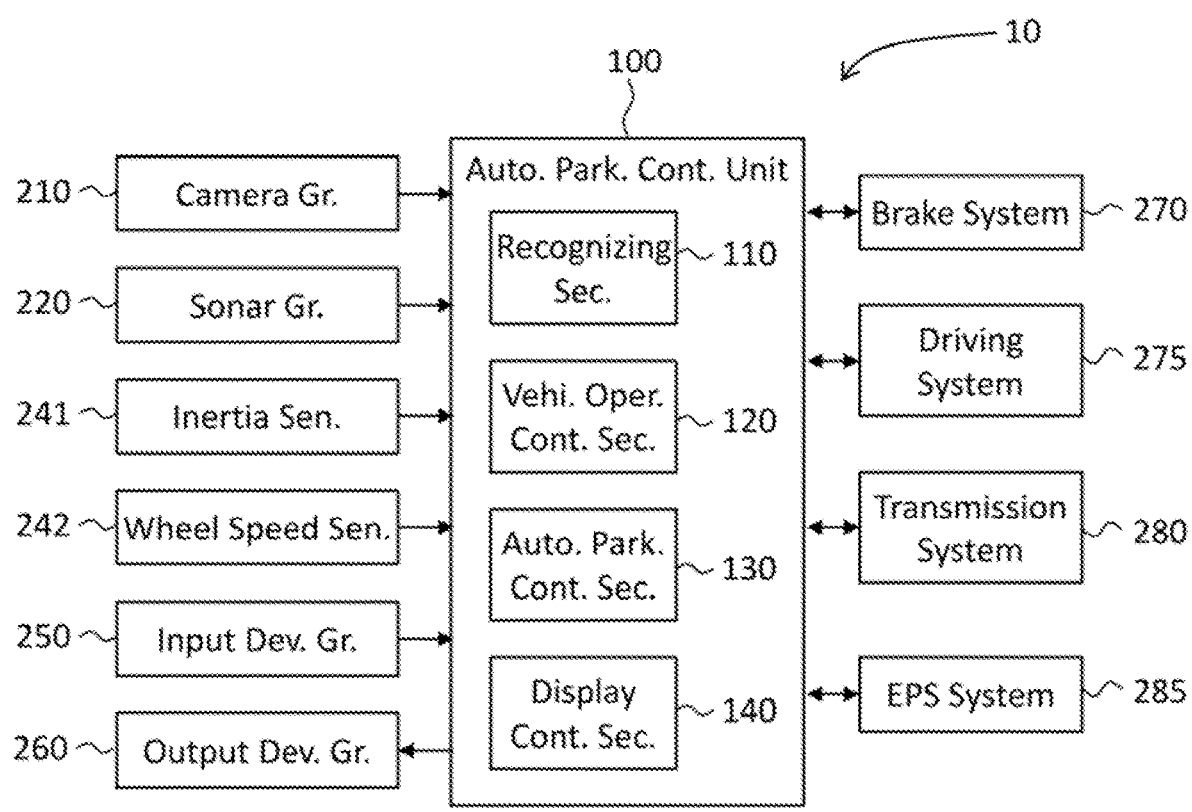
FIG. 1 is a block diagram to schematically show a system configuration of a parking assisting system of an embodiment of the present invention.

Hereinafter, a parking assisting system of an embodiment of the present invention is described. The parking assisting system is intended to automatically park a driver's vehicle (that may be also referred to as "vehicle") in a marked parking space a driver has indicated by controlling a brake system, a driving system, a transmission system and an EPS (Electric Power Steering) system.

During a time period from when an automatic parking is instructed to when the parking is completed, the parking assisting system takes images of a surrounding area of a vehicle, synthesizes the taken images into a top perspective view image (also referred to as "three-dimensional view image" or "image of the vehicle surrounding area") of the vehicle and its surrounding area that are seen from a viewing point located obliquely upward of the vehicle and displays the top perspective view image. The top perspective view image includes an image of the driver's vehicle (also referred to as "driver's vehicle) for a driver to easily recognize a position of the driver's vehicle in the images of the surrounding area of the driver's vehicle. The top perspective view image shows a driver's vehicle that is partially seen translucent and further shows a portion of a road surface and an indicative object that would be blind to the driver.

The parking assisting system displays a top perspective view image (referred to as "frontward top perspective view image") of a vehicle and its surrounding area that is taken from a viewing point rearward and upward of the vehicle, when the vehicle is running frontward. Since a front portion (bonnet side) of the driver's vehicle (engine hood side) is made translucent in this top perspective view image, a front area frontward of the vehicle that is blind to the driver and the driver's vehicle is passing can be seen. As a result, the front area that is blind to the driver is visible, which gives reassurance to the driver.

In addition, the parking assisting system displays a top perspective view image (also referred to as "rearward top perspective view image) of the vehicle and its surrounding area that are seen from a viewing point frontward and upward of the vehicle, when the vehicle is running rearward. Since a rear portion of the driver's vehicle (trunk side) is made translucent in this top perspective view image, a rear area rearward of the driver's vehicle that is blind to the driver and the driver's vehicle is passing can be seen.

Furthermore, the parking assisting system takes images of the surrounding area of the driver's vehicle with cameras, synthesizes the taken images into a top plan view image of the driver's vehicle and its surrounding area (referred to as "image of the surrounding area along the whole outer periphery of the driver's vehicle" or "downward view image") that are seen from a viewing point just upward of the driver's vehicle and displays the top plan view image. The driver can recognize the state of the surrounding area, looking at the top plan view image.

<Configuration of Parking Assisting System>

Figure 2:
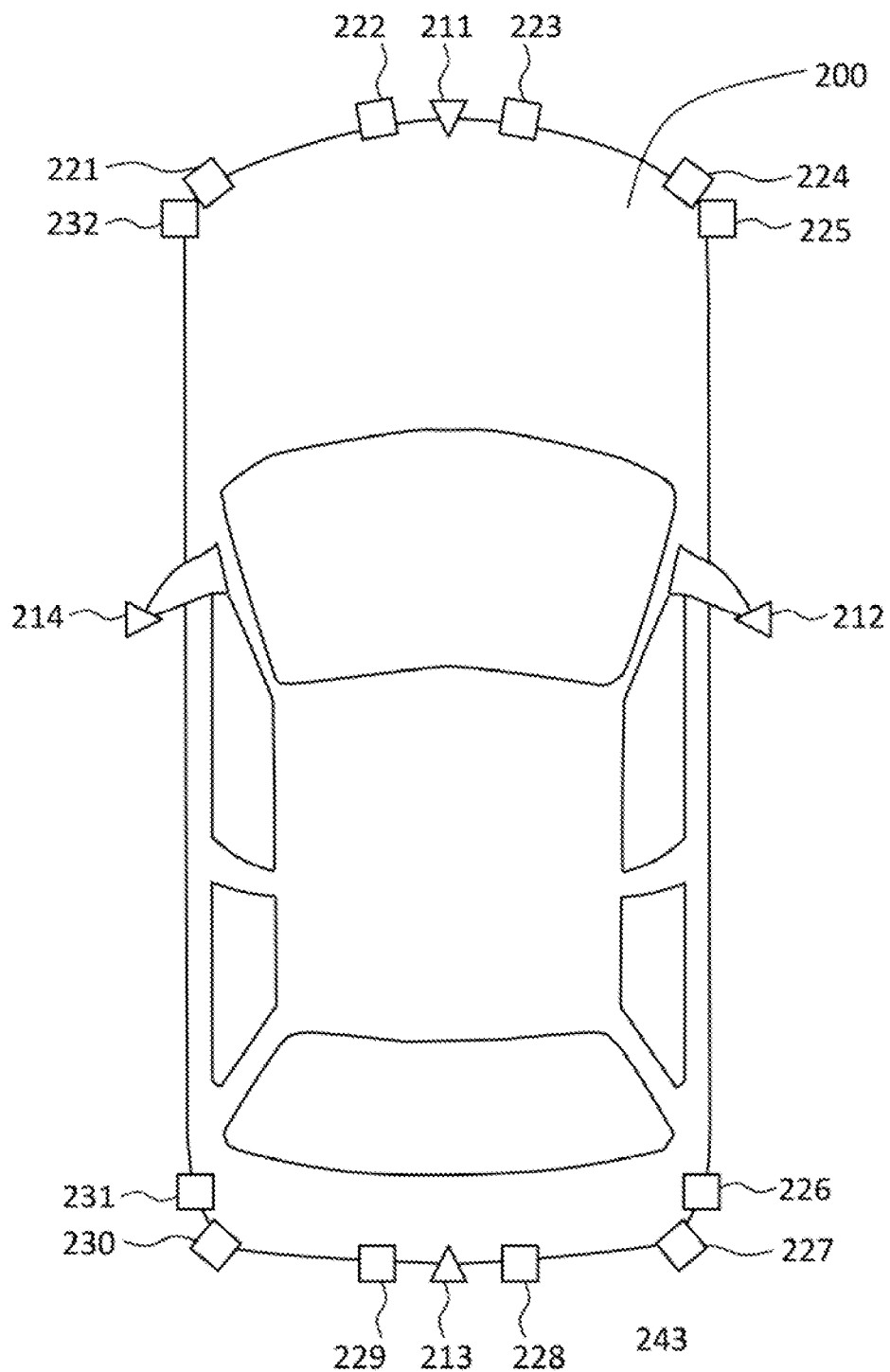
FIG. 2 shows a top plan view of a vehicle equipped with the parking assisting system of the embodiment.
Figure 3:
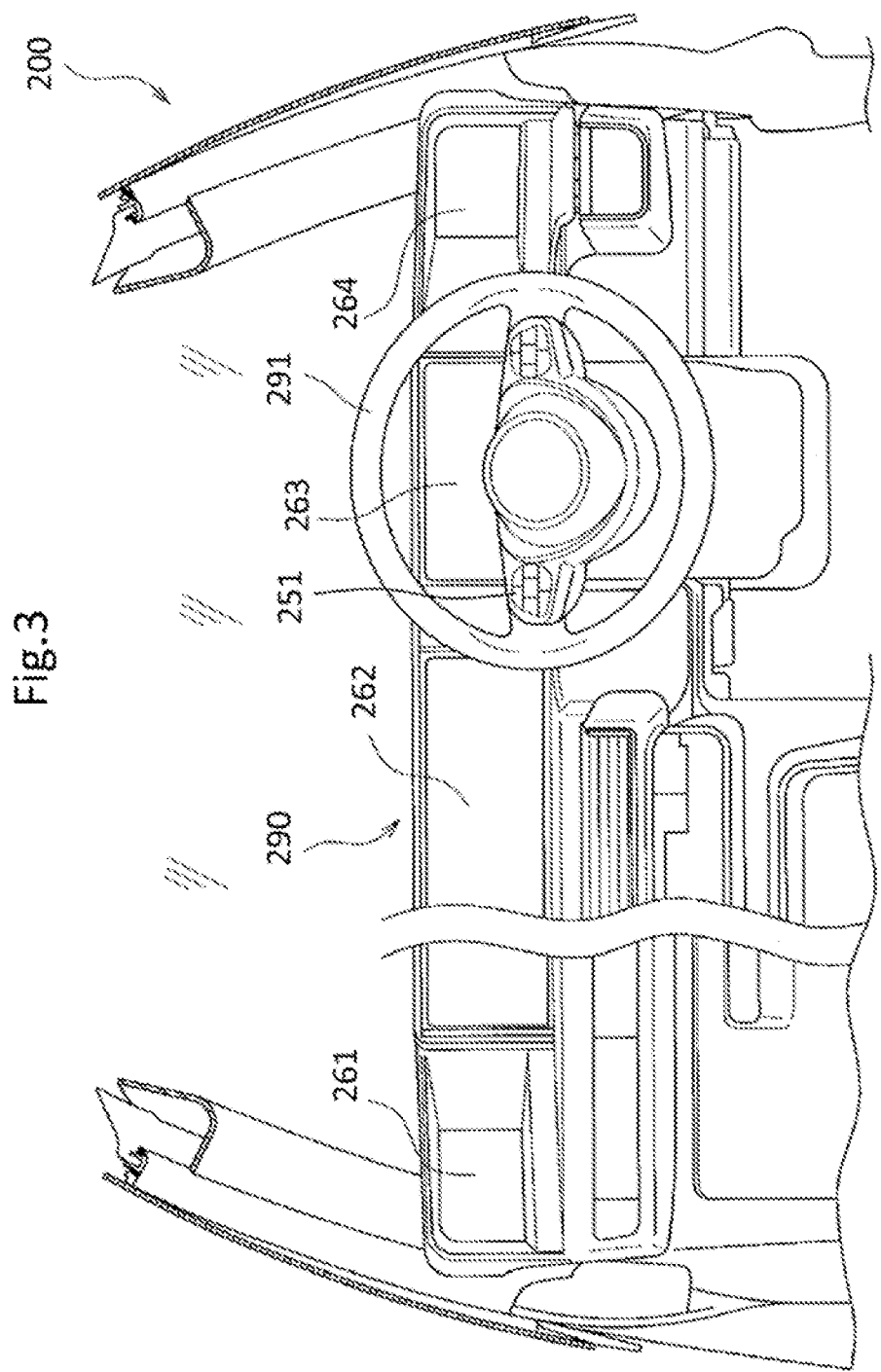
FIG. 3 shows a configuration of a dashboard of the vehicle equipped with the parking assisting system of the embodiment.

FIG. 1 is a block diagram schematically showing a configuration of a parking assisting system 10 of an embodiment of the present invention. FIG. 2 is a top plan view of a vehicle 200 equipped with the parking assisting system 10 of the embodiment. FIG. 3 shows a configuration of a dashboard 290 of the vehicle 200 for the embodiment. The configuration of the parking assisting system 10 is described with reference to FIG. 1 to FIG. 3.

As shown in FIG. 1, the parking assisting system 10 is configured to include an automatic parking control unit 100, a camera group 210, a sonar group 220, an inertia sensor 241, a wheel speed sensor 242, an input device group 250, an output device group 260, a brake system 270, a driving system 275, a transmission system 280 and an EPS system 285. The camera group 210, the sonar group 220, the inertia sensor 241, the wheel speed sensor 242, the input device group 250, the output device group 260, the brake system 270, the driving system 275, the transmission system 280 and the EPS system 285 may be wire-connected directly with an automatic parking control unit 100 or through CAN (Controller Area network) with it.

<Configuration of Parking Assisting System: Various Sensors>

The camera group 210 consists of plural cameras 211 to 214 that are attached to the vehicle 200, as shown in FIG. 2. To be specific, the camera 211 is attached to a front side of the vehicle 200 and takes an image of a front area frontward of the vehicle 200. The camera 213 is attached to a rear side of the vehicle 200 and takes an image of a rear area rearward of the vehicle 200.

The camera 212 is attached to a tip portion of a right side mirror of the vehicle 200 and takes an image of an area on the right side of the vehicle 200. The camera 214 is attached to a tip portion of a left side mirror of the vehicle 200 and takes an image of an area on the left side of the vehicle 200. The cameras 212, 214 may be attached to other portions than the tip portions of the side mirrors and are attached preferably at such positions that the side mirrors are not seen as relatively large images in images taken by the cameras 212, 214. The images taken by the cameras 211 to 214 of the surrounding area of the vehicle 200 are outputted to the automatic parking control unit 100. These images show the road surface, other vehicle and a pedestrian (whose images are included).

The sonar group 220 consists of sonars 221 to 232 that are attached to the vehicle 200, as shown in FIG. 2. To be specific, four sonars 221 to 224 are attached to the front side of the vehicle 200 at nearly equal intervals. The four sonars 221 to 224 detect an obstacle present frontward of the vehicle 200. Four sonars 227 to 230 are attached to the rear side of the vehicle 200 at nearly equal intervals. The four sonars 227 to 230 detect an obstacle present real ward of the vehicle 200.

In addition, a sonar 225 is attached to a front portion of a right side of the vehicle 200 and detects an obstacle in an area right-frontward of the vehicle 200 and in an area on the right side of the vehicle 200. A sonar 226 is attached to a rear portion of a right side of the vehicle 200 and detects an obstacle in an area right-rearward of the vehicle 200 and in an area on the right side of the vehicle 200.

In addition, a sonar 232 is attached to a front portion of a left side of the vehicle 200 and detects an obstacle in an area in an area left-frontward of the vehicle 200 and in an area on the left side of the vehicle 200. A sonar 231 is attached to a rear portion of the left side of the vehicle 200 and detects an obstacle in an area left-rearward of the vehicle 200 and in an area on the left side of the vehicle 200.

The sonars 225, 226, 231, 232 that are attached to the right and left sides of the vehicle 200 detect such an obstacle that is located a relatively short distance away from the vehicle 200 and could interfere with the vehicle 200. Information on the obstacle detected by the sonars 221~232 is outputted to the automatic parking control unit 100.

The numbers and the positions of the aforementioned cameras and the sonars are not limited to those described above, the numbers may be increased or decreased, and the positions may be changed. However, the numbers and the positions of the aforementioned cameras and the aforementioned sonars are selected preferably in such a way that the state of the surrounding area along the whole outer periphery of the vehicle 200 can be detected.

Alternatively or additionally, a radar or a LIDAR (Light Detection and Ranging) may be attached to the vehicle 200. The radar is configured to obtain information on a distribution of indicative objects including whether there is an indicative object, a distance to the indicative object and an orientation of the indicative object by emitting a radio wave and receiving the radio wave reflecting back from the indicative object. The LIDAR detects, for example, whether there is an indicative object and a distance to the indicative object by measuring a time from when a light is emitted to when a scattered light reflecting from an indicative object in comparison with the emitted light, is detected. The parking assisting system 10 may be configured to detect an indicative object with both the radar and the LIDAR.

The inertia sensor 241 is a sensor to detect an acceleration of the vehicle 200. The wheel speed sensor 242 is a sensor to detect a rotation speed of each wheel of the vehicle 200.

<Configuration of Parking Assisting System: Input-Output Device>

The output device group 260 (See FIG. 1) is mounted on the dashboard 290 (See FIG. 3) and is configured to show passengers in a vehicle compartment various pieces of information. A display device 263 is provided at a position facing a driver seat and includes several panel meters, for example, a speed-meter, a tachometer, an odometer, information on a shift position, information on whether each of illumination devices is turned on or not, and the like. A display device 284 at the right side of the dashboard 290 displays images taken by the camera 212 (See FIG. 2) of an area rearward of the right side mirror and on the right side of the vehicle 200 and a lower zone on the right side of the vehicle 200. A display device 261 at the left side of the dashboard 290 displays images taken by the camera 214 (See FIG. 2) of an area rearward of the left side mirror and on the left side of the vehicle 200 and a lower zone on the left side of the vehicle 200.

A display device 262 that is elongated in a vehicle width direction is a multi-information panel and is configured to show map information on an area around the vehicle 200 and a position of the vehicle 200 in the map, and traffic information (including information on a traffic light) on a road along which the vehicle 200 is currently running and a road along which the vehicle 200 is to run, and the like. In addition, the display device 262 displays a top perspective view image and a top plan view image (See FIG. 5~FIG. 11 to be described later).

The output device group 260 includes a speaker for outputting sound in addition to the display devices 261~264.

The input device group 250 includes switches attached to the dashboard 290 and the steering wheel 291 (See FIG. 3). The display device 262 may be a touch-panel display and may be included in the input device group 250 as well. An automatic parking switch 251 is an input device attached to the steering wheel 291. Once a driver depresses the automatic parking switch 251, the automatic parking control unit 100 starts an automatic parking operation (See FIG. 4 to be described later).

<Configuration of Parking Assisting System: Driving System>

FIG. 1 is viewed again. The brake system 270 is a system to brake the vehicle 200. The brake system 270 includes a brake device to brake the vehicle 200 and a brake control unit to control the brake device.

The driving system 275 is a system to drive the vehicle 200 to run. For instance, if the vehicle 200 is a hybrid vehicle, the driving system 275 includes a hybrid control unit in addition to an engine and a motor-generator which work as driving sources. If the vehicle 200 is a gasoline fueled automobile, its driving source is only an engine. If the vehicle 200 is an electric vehicle that may be a fuel cell vehicle, its driving source is only a motor.

The transmission system 280 is a system to perform a shift of the vehicle 200. The transmission system 280 includes a transmission to perform the shift of the vehicle 200, a transmission control unit to control the transmission and a shift lever engaging with the transmission.

The EPS system 285 is an electric power-steering system to assist a driver to steer the vehicle 200. The EPS system 285 includes a steering axis to which a steering wheel 291 is attached, a driving motor to drive the steering axis to rotate and an EPS control unit to control the driving moor. The EPS system 285 is configured to assist a driver in an operation of the driver turning the steering wheel 291 to steer the vehicle 200 with the driving motor to drive the steering axis to rotate <Configuration of Parking Assisting System: Automatic Parking Control Unit>

The automatic parking control unit 100 (Parking Assisting Device) comprises an ECU (Electronic Control Unit) that operates based on a control program and performs functions of a recognizing section 110, a vehicle operation control section 120, an automatic parking control section 130 and a display control section 140. The control program (also referred to as "program") is stored in the automatic parking control unit 100.

The recognizing section 110 recognizes the surrounding area of the vehicle 200 (outer world) based on the images taken by the camera group 210 and the information on obstacles detected by the sonar group 220. For instance, the recognizing section 110 recognizes (detects) a marked parking space 331 (See FIG. 5 to be described later). The recognizing section 110 recognizes (detects) a parking position (parking vehicle box space 332 in FIG. 6 to be described later) at which the vehicle 200 can be parked The vehicle operation control section 120 is configured to control the brake system 270, the driving system 275, the transmission system 280 and the EPS system 285 to steer, accelerate and decelerate the vehicle 200. The vehicle operation control section 120 controls the brake system 270, the driving system 275, the transmission system 280 and the EPS system 285 in such a way that the vehicle 200 runs along a target translation route outputted by the automatic parking control section 130.

The automatic parking control section 130 performs the automatic parking operation (See FIG. 4 to be described later) and controls the total parking assisting system 10. To be specific, when the automatic parking switch 251 being depressed is detected, the automatic parking control section 130 instructs the display control section 140 to display automatic parking screen images 300~306 (See FIG. 5~FIG. 11 to be described later). Next, the automatic parking control section 130 instructs the recognizing section 110 to output to the display control section 140 a position of the parking vehicle box space 332 (See FIG. 6 to be described later). The display control section 140 displays the parking vehicle box space 332 outputted by the recognizing section 110.

When a driver selects a parking vehicle box space after the vehicle 200 is stopped by a brake pedal being operated (pressed down by foot), the automatic parking control section 130 calculates the target translation route for the vehicle 200 to run from the current stop position to the selected parking vehicle box space (target parking position) while getting around an obstacle. The information on the obstacle is obtained from the sonar group 220. The automatic parking control section 130 outputs the target translation route to the vehicle operation control section 120. The vehicle 200 is controlled by the vehicle operation control section 120 to move to the selected parking vehicle box space and stop there. Subsequently, the automatic parking control section 130 instructs the display control section 140 to end displaying the automatic parking function screen image.

The display control section 140 synthesizes the images taken by the camera group 210 into a top perspective view image and outputs the top perspective view image to the display device 262. The top perspective view image may be either a top perspective view image (See "frontward top perspective view image 311" in FIG. 5 to be described later) of the vehicle 200 and its surrounding area that are seen from a viewing point rearward and upward of the vehicle 200 or a top perspective view image (See "rearward top perspective view image 312" in FIG. 5 to be described later) of the vehicle 200 and its surrounding area that are seen from a viewing point frontward and upward of the vehicle 200. The display control section 140 synthesizes the images taken by the camera group 210 into a top plan view image 313 (See FIG. 5~FIG. 11 to be described later) of the vehicle 200 and its surrounding area that are seen from a viewing point just upward of the vehicle 200 and outputs the top plan view image to the display device 262. The display device 262 displays both the top perspective view image and the top plan view image side-by-side.

When the vehicle 200 is running frontward, the display control section 140 produces the frontward top perspective view of the vehicle 200 and its surrounding area that are seen from a viewing point rearward and upward of the vehicle 200 and outputs the frontward top perspective view to the display device 262.

In this case, the frontward top perspective view image that the display control section 140 produces has the front portion of the vehicle 200 that is made translucent so that the front area that is blind to the driver is visible (See FIG. 8 to be described later).

When the vehicle 200 is running rearward, the display control section 140 produces the rearward top perspective view of the vehicle 200 and its surrounding area that are seen from a viewing point frontward and upward of the vehicle 200 and outputs the rearward top perspective view to the display device 262.

In this case, the rearward top perspective view image that the display control section 140 produces has the rear portion of the vehicle 200 that is made translucent so that the rear area that is blind to the driver is visible (See FIG. 9 to be described later).

The front portion or the rear portion of the vehicle 200 is not necessarily kept translucent by the display control section 140 over a period of the whole automatic parking operation. A timing when the front portion or the rear portion of the vehicle 200 is made translucent by the display control section 140 is explained later.

<Automatic Parking Operation>

How to operate the parking assisting system 10 is explained before how the parking assisting system works is explained. When a driver switches on the automatic parking switch 251 (See FIG. 3), the parking assisting system 10 is enabled and the automatic parking function screen image 300 (See FIG. 5 to be described later) is displayed on the display device 262. The parking assisting system 10 recognizes marked parking spaces, looks for and finds parking vehicle box spaces at which the vehicle 200 can be parked, and displays the automatic parking function screen image 301 (See FIG. 6 to be described later).

The driver stops the vehicle 200 near a parking vehicle box space. Then, the driver touches the parking vehicle box space indicated on the screen image 301 on the display device 262 (Touch Panel Display) to select a parking vehicle box space for the vehicle 200 to be parked. Then, the parking assisting system 10 outputs through the speaker a sound message that says "Automatic driving for parking is starting. Keep your hands off the steering wheel and put your foot off the brake pedal."

When the driver hears the sound message, the driver stops operating the brake pedal (putting the foot off the brake pedal). The parking assisting system 10 drives the vehicle 200 to run to the selected parking vehicle box space, stops the vehicle 200 there and ends displaying the automatic parking function screen image.

Figure 4:
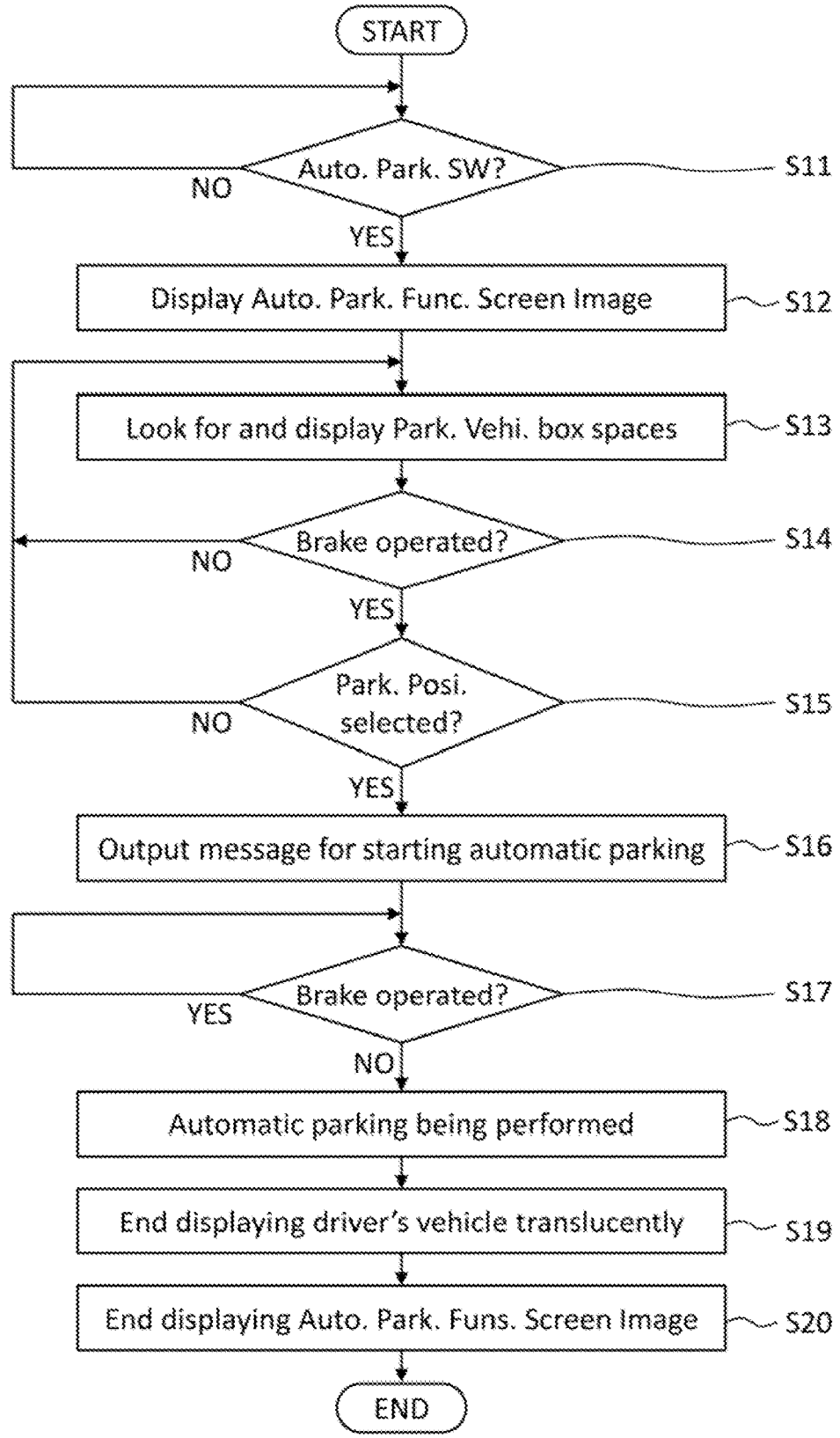
FIG. 4 shows a flowchart of an automatic parking operation of the embodiment.

FIG. 4 is a flowchart of an automatic parking operation of the embodiment. The description below on this flowchart starts with the driver looking for a parking vehicle box space in a parking area where vehicles are parked in parallel while the driver is driving the vehicle 200 to run frontward.

In Step S11, the automatic parking control section 130 has the operation proceed to Step S12 if the automatic parking switch 251 (referred to as "Automatic Parking SW" in FIG. 4) is depressed (Yes in Step S11), and has the operation goes back to Step S11 unless the automatic parking switch 251 is depressed (No in Step S11).

In Step S12, the automatic parking control section 130 instructs the display control section 140 to display the automatic parking screen image. The display control section 140 produces the frontward top perspective view image and the top plan view image from the images taken by the camera group 210 and display them on the display device 262.

Figure 5:
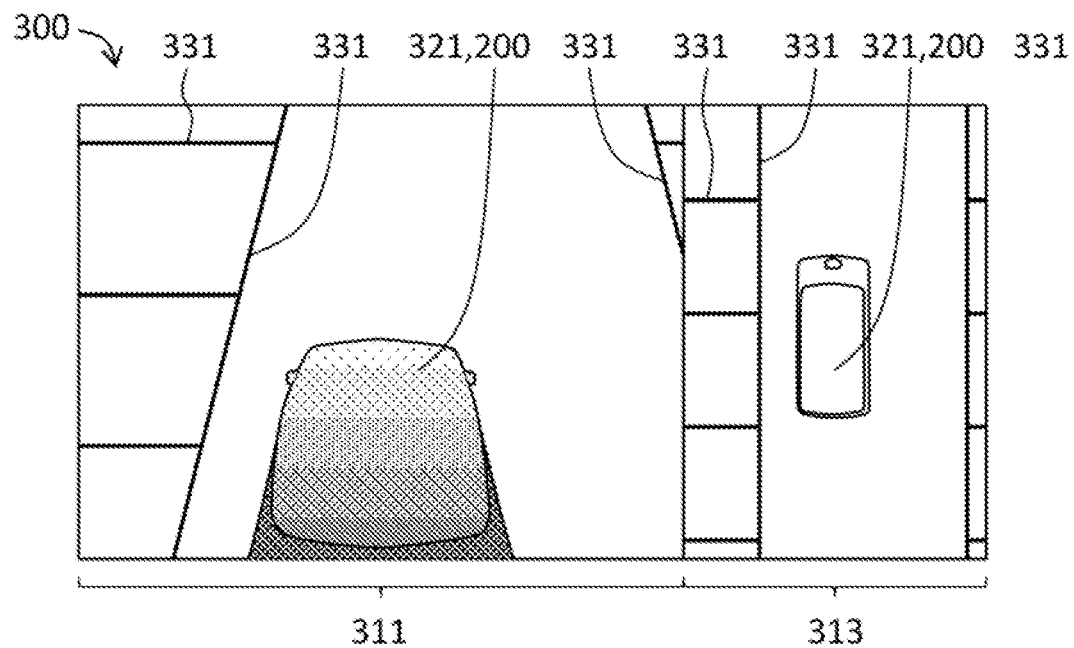
FIG. 5 is an automatic parking function screen image of the embodiment.

FIG. 5 is a figure describing the automatic parking function screen image 300 of the embodiment. The frontward top perspective view image 311 and the top plan view image 313 are shown in the automatic parking function screen image 300. Since the vehicle 200 is running frontward, the frontward top perspective view image 311 is displayed. When the vehicle 200 is running rearward, the rearward top perspective view image 312 (See FIG. 9 to be described later) is displayed.

The surrounding area of the vehicle 200 imaged by the camera group 210 including the marked parking spaces 331 is shown in each of the frontward top perspective view image 311 and the top plan view image 313. In addition, an image of the vehicle 200 that is a driver's vehicle is displayed, being superimposed on each of the frontward top perspective view image 311 and the top plan view image 313. The driver's vehicle 321 that is partially translucent is described with reference to FIG. 8 and FIG. 9 to be described later.

In Step S13 shown in FIG. 4, the automatic parking control section 130 instructs the recognizing section 110 to display the parking vehicle box spaces 332. The recognizing section 110 recognizes the marked parking spaces 331 and looks for and detects parking vehicle box spaces 332 at which the vehicle can be parked. The recognizing section 110 outputs the position of the detected parking vehicle box spaces 332 to the display control section 140. The display control section 140 shows the detected parking vehicle spaces 332 in each of the frontward top perspective view image 311 and the top plan view image 313.

Figure 6:
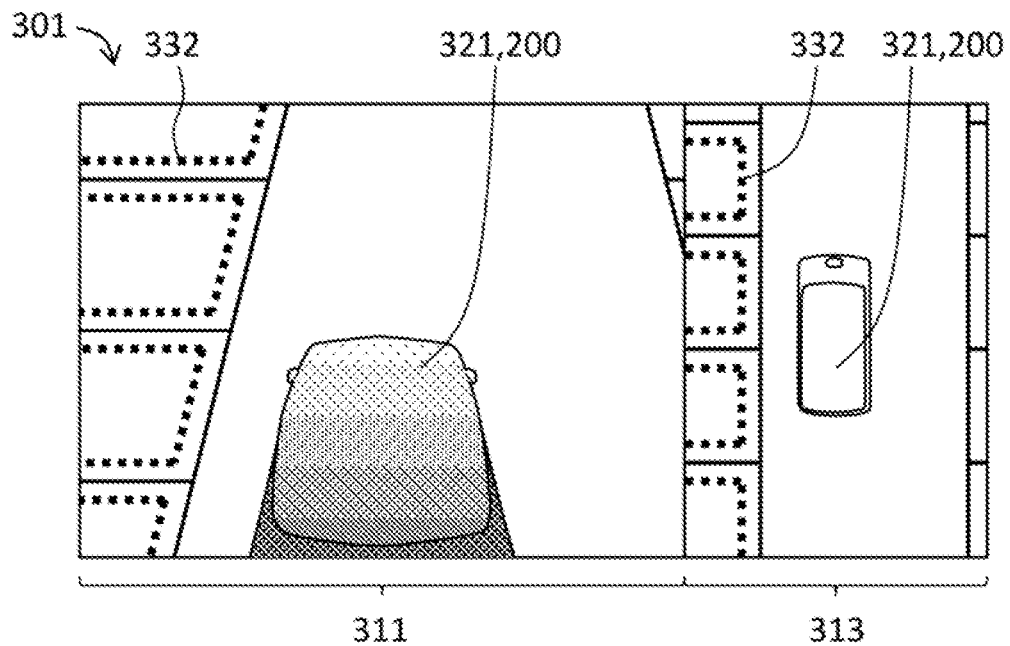
FIG. 6 is an automatic parking function screen image of the embodiment showing parking vehicle box spaces.

FIG. 6 is a figure describing the automatic parking function screen image 301 of the embodiment showing parking vehicle box spaces 332. The display control section 140 outputs to the display device 262 the frontward top perspective view image 311 and the top plan view image 313, on each of which enclosing dotted lines representing the parking vehicle box space 332 are superimposed.

In Step S14 shown in FIG. 4, the automatic parking control section 130 has the operation proceed to Step S15 if the brake is operated (the brake pedal is pressed down by foot, Yes in Step S14) and has the operation return to Step S13 if the brake is not operated (No in Step S14). When the operation proceeds to Step S15, the vehicle 200 is at a stop.

The automatic parking control section 130 obtains information on the state of the brake from the brake system 270.

In Step S15, the automatic parking control section 130 has the operation proceed to Step S16 if a parking position (parking vehicle box space) is selected (Yes in Step S15) and has the operation return to Step S13 if the parking position is not selected (No in Step S15). The driver can select the parking position by touching a parking vehicle box space the driver prefers from among the parking vehicle box spaces shown on the display device 262 that is a touch panel display.

When the parking position is selected, the automatic parking control section 130 instructs the display control section 140 to show the selected parking vehicle box space emphatically. Once instructed, the display control section 140 shows the selected parking vehicle box space emphatically.

Figure 7:
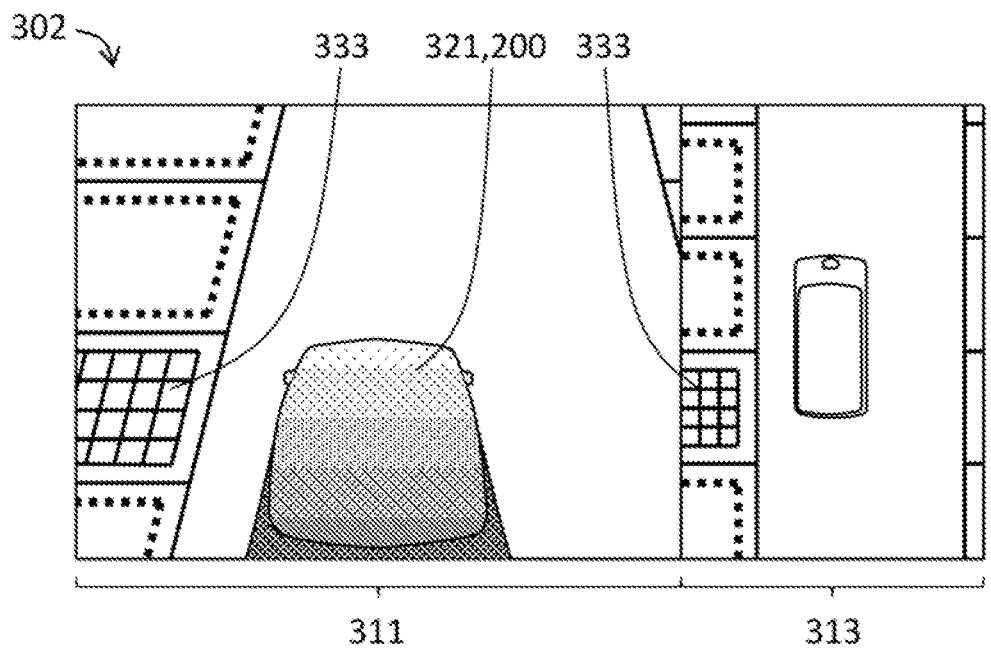
FIG. 7 is an automatic parking function screen image of the embodiment showing a selected parking vehicle box space that is emphatically indicated.

FIG. 7 is a figure describing an automatic parking function screen image 302 of the embodiment showing the selected parking vehicle box space 333 that is emphatically shown. The display control section 140 makes the selected parking vehicle box space 333 an emphatically indicated area and outputs to the display device 262 the frontward top perspective view image 311 and the top plan view image 313 on each of which the selected parking vehicle box space emphatically shown is superimposed.

In Step S16 shown in FIG. 4, the automatic parking control section 130 outputs a message for starting automatic parking. For instance, a sound message of "Automatic parking is starting. Keep your hands off the steering wheel and put your foot off the brake pedal." is outputted from the speaker. The automatic parking control section 130 may instruct the display control section 140 to show a text message of the same content on the display device 262.

In Step S17, the automatic parking control section 130 has the operation return to Step S17 if the brake is being operated (the brake pedal is being pressed by foot, Yes in Step S17) and has the operation proceed to Step S18 if the brake is not operated (the brake is not pressed by foot, No in Step S17). When the driver puts his or her foot off the brake pedal, the operation goes ahead to Step S18.

In Step S18, the automatic parking control section 130 calculates a target translation route for the vehicle 200 to run from where the vehicle 200 is at a stop to the selected parking vehicle box space 333 (See FIG. 7) while getting around an obstacle. Information on the obstacle is obtained from the sonar group 220. The automatic parking control section 130 outputs the target translation route to the vehicle operation control section 120.

When receiving the target translation route, the vehicle operation control section 120 controls the brake system 270, the driving system 275, the transmission system 280 and the EPS system 285 to have the vehicle 200 run along the target translation route.

Hereinafter, the target translation route calculated in Step S18 is explained based on an assumption that the target translation route is a route along which the vehicle 200 runs frontward with the steering wheel 291 being turned clockwise, stops temporarily at a turning back position, and runs rearward with the steering wheel being turned counterclockwise into the selected parking vehicle box space 333 (See FIG. 7).

Figure 8:
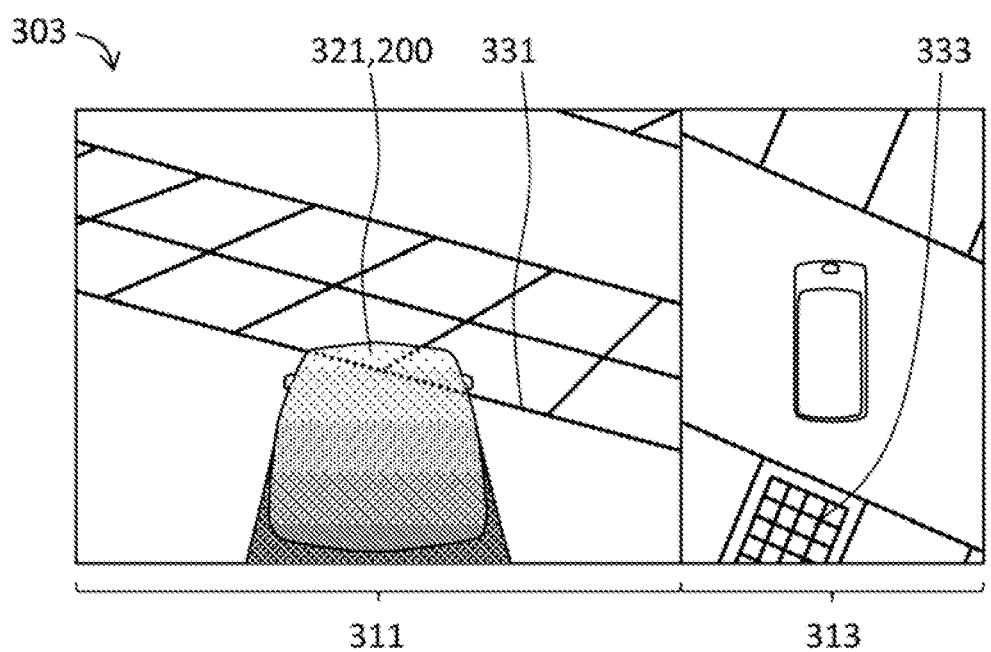
FIG. 8 is an automatic parking function screen image of the embodiment including an image of a vehicle running frontward.

FIG. 8 is a figure describing the automatic parking function screen image 303 of the embodiment showing the vehicle 200 running frontward for the automatic parking. While the vehicle 200 is running frontward during the automatic parking, the display control section 140 produces the frontward top perspective view image 311 and outputs the frontward top perspective view image 311 to the display device 262. Since the selected parking vehicle box space 333 is recognized, the frontward top perspective view image 311 and the top plan view image 313 do not show other parking vehicle box spaces 332 (See FIG. 8). The top plan view image 313 shows the selected parking vehicle box space 333 that is indicated emphatically. However, the selected parking vehicle box space 333 is located rearward of the vehicle 200, which is not included in the frontward top perspective view image 311.

In the frontward top perspective view in FIG. 8, the vehicle 200 that is a driver's vehicle 321 overlaps partially with marked parking spaces 331, which can be seen through the front portion of the vehicle 200 that is made translucent (These marked parking spaces 331 are defined by dotted lines in FIG. 8). The front portion of the driver's vehicle 321 is shown in the frontward top perspective view image 311 in a manner that the frontward portion of the front portion (upper portion in FIG. 8) is more transparent than the rearward portion of the front portion (lower portion in FIG. 8). Therefore, visibility through the front portion of the vehicle 200 is better through the frontward portion than through the rearward portion (the rearward portion is more densely hatched than the frontward portion in FIG. 8).

Figure 9:
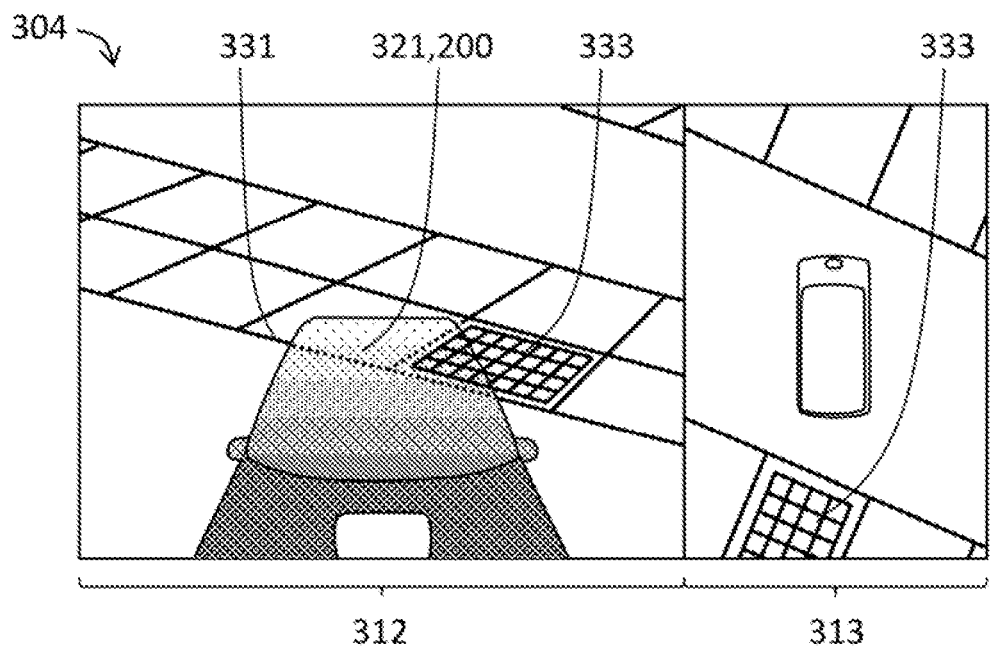
FIG. 9 is an automatic parking function screen image of the embodiment including an image of a vehicle running rearward.

FIG. 9 is a figure describing the automatic parking function screen image 304 of the embodiment showing the vehicle 200 running rearward for the automatic parking. While the vehicle 200 is running rearward during the automatic parking, the display control section 140 produces the rearward top perspective view image 312 and outputs the rearward top perspective view image 312 to the display device 262. Since the selected parking vehicle box space 333 is recognized, the rearward top perspective view image 312 and the top plan view image 313 do not show other parking vehicle box spaces 332 (See FIG. 9). Both the rearward top perspective view image 312 and the top plan view image 313 show the selected parking vehicle box space 333 that is indicated emphatically.

In the rearward top perspective view image 312 in FIG. 9, though the vehicle 200 that is the drivers vehicle 321 overlaps partially with the marked parking space 331, the marked parking space 331 and the selected parking vehicle box space 333 are seen through the rear portion of the vehicle 200 that is transparent (the overlapped marked parking space 331 is defined by dotted lines in FIG. 9). The rear portion of the driver's vehicle 321 is shown in the rearward top perspective view image 312 in a manner that the rearward portion of the rear portion (upper portion in FIG. 9) is more transparent than the frontward portion of the rear portion (lower portion in FIG. 9). Therefore, visibility through the rear portion of the vehicle 200 is better through the rearward portion than through the frontward portion (the frontward portion is more densely hatched than the rearward portion in FIG. 8).

Figure 10:
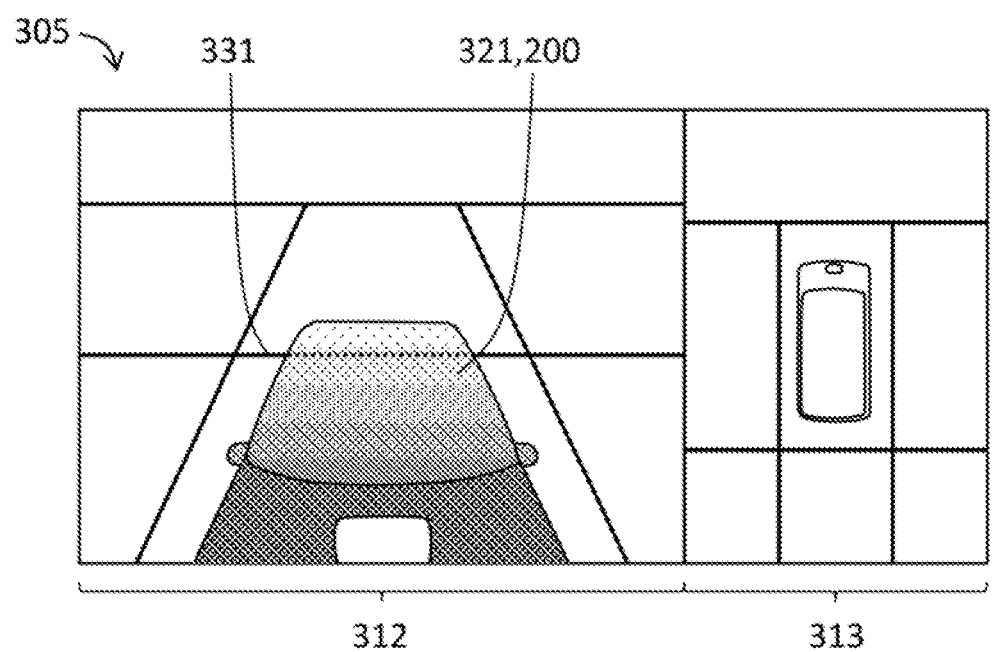
FIG. 10 is an automatic parking function screen image of the embodiment showing a vehicle having just been parked in the selected parking vehicle box space.

FIG. 10 is a figure describing the automatic parking function screen image 305 of the embodiment showing the vehicle 200 having just been parked at the selected parking vehicle box space 333. Since the vehicle 200 stops after running rearward, the rearward top perspective view image 312 has been produced and continues to be displayed on the display device 262. The automatic parking at the selected parking vehicle box space 333 is completed and the selected parking vehicle box space is not shown. In this rearward top perspective view image 312, though the vehicle that is the driver's vehicle 321 overlaps partially with a marked parking space 331, the marked parking space 331 is seen through the rear portion of the vehicle 200 that is made transparent (the overlapped portion of the marked parking space 331 is indicated by a dotted line in FIG. 10).

Figure 11:
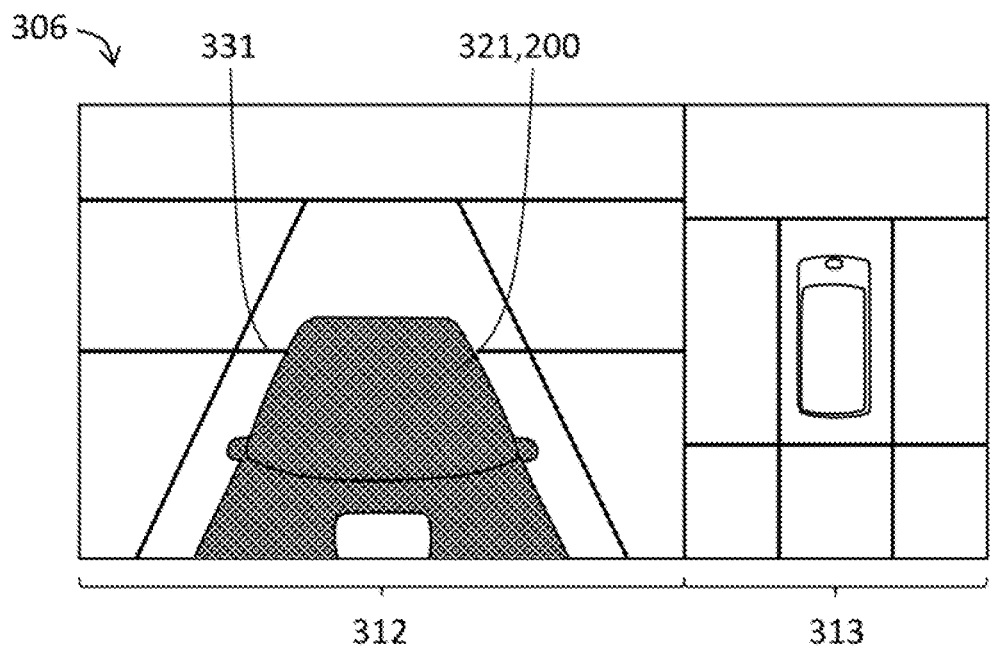
FIG. 11 is an automatic parking function screen image of the embodiment, the automatic parking function screen image being just after showing translucently a portion of a driver's vehicle is ended.

In Step S19 shown in FIG. 4, the automatic parking control section 130 instructs the display control section 140 to end displaying the driver's vehicle 321 translucently. Once instructed, the display control section 140 ends displaying the vehicle 200 that is the driver's vehicle 321 translucently. FIG. 11 is a figure describing the automatic parking function screen image 306 of the embodiment just after showing the driver's vehicle 321 translucently is ended. In this rearward top perspective view image 312, the driver's vehicle 321 is not translucently shown and the marked parking space 331 that overlaps partially with the vehicle 200 cannot be seen.

In Step S20 shown in FIG. 4, the automatic parking control section 130 instructs the display control section 140 to end displaying the automatic parking function screen image 306 when a predetermined time elapses after showing the driver's vehicle 321 translucently is ended in Step S19.

<Features of Parking Assisting System>

The parking assisting system 10 synthesizes the images take by the camera group 210 into the frontward top perspective view image 311 and displays the frontward top perspective view image 311 on the display device 262, when the vehicle 200 is running frontward for the automatic parking. On the other hand, the parking assisting system 10 synthesizes the images taken by the camera group 210 into the rearward top perspective view image 312 and displays the rearward top perspective view image 312 on the display device 262, when the vehicle 200 is running rearward for the automatic parking.

The frontward top perspective view image 311 shows the driver's vehicle whose front portion is seen translucent (See FIG. 8). On the other hand, the rearward top perspective view image 312 shows the driver's vehicle 321 whose rear portion is seen translucent (See FIG. 9). Depending on a direction in which the driver's vehicle is running, the parking assisting system 10 is able to show translucently either the front portion or the rear portion of the driver's vehicle 321. As a result, the parking assisting system 10 is able to show the driver the state of the surrounding area of the driver's vehicle 321 which the driver's vehicle 321 is passing and is blind to the driver and reassure the driver during the automatic parking operation.

Modified Example

The present invention should not be limited to the aforementioned embodiment. The automatic parking control unit 100 may comprise plural ECUs instead of a single ECU in the aforementioned embodiment.

In addition, the driver's vehicle in the top perspective view image (three-dimensional view image) is displayed translucently in the aforementioned embodiment. The top perspective view image showing the driver's vehicle translucently may be displayed not only during the automatic parking operation but also when an instruction is given to display the vehicle surrounding area image like when MVC (Multi View Camera) is enabled.

In the aforementioned embodiment, showing translucently the driver's vehicle is ended after the automatic parking is completed (See Step S18 in FIG. 4). However, the driver's vehicle may continue to be shown translucently.

In addition, the driver's vehicle is shown translucently in the embodiment aforementioned when the automatic parking function screen image 300 is displayed on the automatic parking switch 251 being depressed (See Step S11~Step S12, FIG. 5 and FIG. 6). On the other hand, the driver's vehicle may be shown opaquely until the parking position is selected (corresponding to FIG. 5 and FIG. 6) and may be shown translucently after the parking position is selected in Step S15 (corresponding to FIG. 7~FIG. 10).

In the aforementioned embodiment, the automatic parking is started by performing a procedure of switching on the automatic parking switch (See Step S11), the brake operation (See Step S14), selecting the parking position and stopping the brake operation (See Step s17) in this order. However, other procedure may be taken for starting the automatic parking.

In the aforementioned embodiment, the portion of the driver's vehicle 321 that is translucently shown, which is the front portion in the frontward top perspective view image 311 or the rear portion in the rearward top perspective view image 312, becomes more transparent from its lower portion toward its upper portion in each of the frontward top perspective view image 311 and the rearward top perspective view image 312 (Darkness of the hatching changes in the same way among FIG. 5~FIG. 10 (gradation)). On the other hand, there may be a difference in how the driver's vehicle is translucently shown between the frontward top perspective view image 311 and the rearward top perspective view image 312. Since the blind area for the driver is larger on the rear side of the driver's vehicle 321, the portion of the rear portion of the driver's vehicle 321 where transparency is relatively high is enlarged in the rearward top perspective view image 312.

Figure 12:
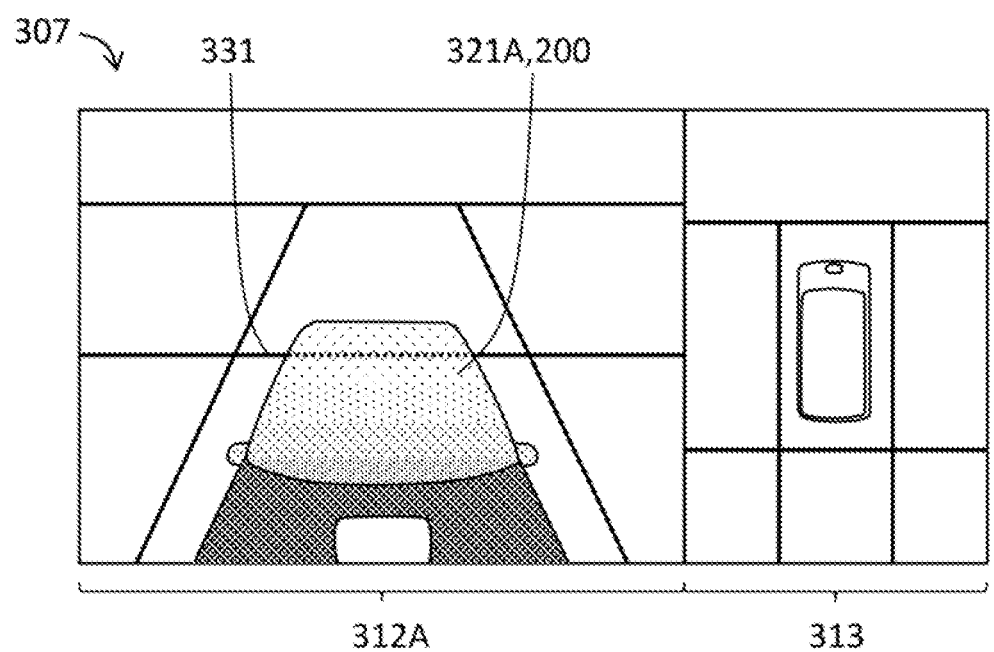
FIG. 12 is a rearward top perspective view image of a modified example of the embodiment, the rearward top perspective view image showing the driver's vehicle, a larger portion of which is more transparent.

FIG. 12 is a figure describing a rearward top perspective view image 312A including a rearward perspective view image of the driver's vehicle 321A that is seen having a larger area whose transparency is high. Compared with the driver's vehicle 321 in rearward top perspective view image 312 in FIG. 10, the rearward perspective view image of the driver's vehicle 321A has a larger area whose transparency is high. As a result, the blind area to the driver is displayed clearer and the driver is able to recognize the state in an area on the rear side of the vehicle 200.

Looking at the rearward top perspective views of the driver's vehicles 321, 321A, the transparency of their rear portions becomes stepwise higher from their lower portions toward their upper portions. There may be only a couple of transparency levels, a transparent portion and a translucent portion in each of the driver's vehicles 321, 321A. There may be a difference in the size of the translucent portion between the frontward top perspective view image of the driver's vehicle (in the front portion) and the rearward top perspective view image of the driver's vehicle (in the rear portion).

What is claimed is:

1. A parking assisting device comprising an electronic control unit, wherein the electronic control unit is configured to:
   recognize an outer world outside a vehicle;
   control an operation of the vehicle;
   perform a parking operation to park the vehicle at a target parking position that is determined with a predetermined measure;
   produce a first image of a surrounding area of the vehicle from images taken of the surrounding area of the vehicle by an imaging device with which the vehicle is equipped; and
   display a three-dimensional view image of the vehicle and its surrounding area as seen from a viewpoint, wherein the three-dimensional view image includes a first vehicle body image of the vehicle and the first image of the surrounding area of the vehicle on which the first vehicle body image is superimposed, the viewpoint is located rearward and obliquely upward of the vehicle when the vehicle is running frontward, the viewpoint is located frontward and obliquely upward of the vehicle when the vehicle is running rearward, the first vehicle body image shows a portion of the vehicle made translucent, which makes a blind area visible to a driver in the surrounding area of the vehicle, the portion of the vehicle made translucent is changed according to a direction in which the vehicle is running, the first vehicle body image shows a translucent front portion of the vehicle and an opaque rear portion of the vehicle when the vehicle is running frontward, and the first vehicle body image shows a translucent rear portion of the vehicle and an opaque front portion of the vehicle when the vehicle is running rearward.

2. The parking assisting device as claimed in claim 1, wherein the electronic control unit is configured to display an image of an actual road surface that could not be seen without the portion of the vehicle made translucent, the image of the actual road surface being superimposed on an image of the portion of the vehicle made translucent.

3. The parking assisting device as claimed in claim 1, wherein the electronic control unit is configured to:

produce a second image of the surrounding area of the vehicle from images taken of the surrounding area of the vehicle by the imaging device with which the vehicle is equipped; and display, in addition to the three-dimensional view image of the vehicle and its surrounding area, a top plan view image showing the surrounding area along a whole periphery of the vehicle, and the top plan view image includes a second vehicle body image of the vehicle and the second image of the surrounding area of the vehicle on which the second vehicle body image is superimposed.

4. The parking assisting device as claimed in claim 3, wherein the first vehicle body image superimposed on the three-dimensional view image shows the vehicle including the portion of the vehicle made translucent, while the second vehicle body image superimposed on the top plan view image shows the vehicle that does not have any portion made translucent.

5. The parking assisting device as claimed in claim 1, wherein the portion of the vehicle made translucent in the vehicle body image is no longer made translucent when the parking operation of the vehicle is completed.

6. The parking assisting device as claimed in claim 1, wherein there is a difference in a size of the portion of the vehicle made translucent between the front portion and the rear portion of the vehicle.

7. A parking assisting method for a parking assisting device, the method comprising;

recognizing an outer world of a vehicle;

performing an operation control on the vehicle;

parking the vehicle at a target parking position determined with a predetermined measure;

producing an image of a surrounding area of the vehicle from images taken by an imaging device with which the vehicle is equipped;

displaying, on a display device with which the vehicle is equipped, a three-dimensional view image of the vehicle and its surrounding area as seen from a viewpoint, wherein the three-dimensional view image includes a vehicle body image of the vehicle and the image of the surrounding area of the vehicle on which the vehicle body image is superimposed;

making a portion of the vehicle shown in the vehicle body image translucent, which makes a blind area visible to a driver in the surrounding area of the vehicle; and changing the translucent portion of the vehicle according to a direction in which the vehicle is running, wherein the viewpoint is located rearward and obliquely upward of the vehicle when the vehicle is running frontward, the viewpoint is located frontward and obliquely upward of the vehicle when the vehicle is running rearward, a front portion of the vehicle shown in the vehicle body image is made translucent and a rear portion of the vehicle shown in the vehicle body image is made opaque when the vehicle is running frontward, and the rear portion of the vehicle shown in the vehicle body image is made translucent and the front portion of the vehicle shown in the vehicle body image is made opaque when the vehicle is running rearward.

8. A storage medium storing a program causing an electronic control unit to perform operations comprising:

recognizing an outer world outside a vehicle;

controlling an operation of the vehicle;

performing a parking operation to park the vehicle at a target parking position that is determined with a predetermined measure;

producing a first image of a surrounding area of the vehicle from images taken of the surrounding area of the vehicle by an imaging device with which the vehicle is equipped; and displaying a three-dimensional view image of the vehicle and its surrounding area as seen from a viewpoint, wherein the three-dimensional view image includes a first vehicle body image of the vehicle and the first image of the surrounding area of the vehicle on which the first vehicle body image is superimposed, the viewpoint is located rearward and obliquely upward of the vehicle when the vehicle is running frontward, the viewpoint is located frontward and obliquely upward of the vehicle when the vehicle is running rearward, the first vehicle body image shows a portion of the vehicle made translucent, which makes a blind area visible to a driver in the surrounding area of the vehicle, the portion of the vehicle made translucent is changed according to a direction in which the vehicle is running, the first vehicle body image shows a translucent front portion of the vehicle and an opaque rear portion of the vehicle when the vehicle is running frontward, and the first vehicle body image shows a translucent rear portion of the vehicle and an opaque front portion of the vehicle when the vehicle is running rearward.

* * * * *